United States Patent [19]
Di Peso

[11] Patent Number: 5,926,972
[45] Date of Patent: Jul. 27, 1999

[54] ANIMAL GROOMING APPARATUS

[76] Inventor: Charles C. Di Peso, Walking Spear Ranch, Rte. 1 Box 43, Cochise, Ariz. 85606

[21] Appl. No.: 08/962,769

[22] Filed: Nov. 3, 1997

Related U.S. Application Data

[60] Provisional application No. 60/032,983, Dec. 16, 1996.

[51] Int. Cl.[6] .................................................. D06F 58/00
[52] U.S. Cl. .............................................. 34/128; 34/129
[58] Field of Search ............................... 34/523, 566, 83, 34/84, 98, 127, 128, 129, 223, 224, 232

[56] References Cited

U.S. PATENT DOCUMENTS

| | | |
|---|---|---|
| 4,934,069 | 6/1990 | Kägi . |
| 5,117,652 | 6/1992 | Takeuchi et al. ........................ 62/291 |
| 5,216,822 | 6/1993 | Madiedo ................................. 34/97 X |
| 5,251,281 | 10/1993 | Fravel . |
| 5,317,860 | 6/1994 | Dunn ....................................... 56/12.8 |
| 5,555,643 | 9/1996 | Guasch ................................. 34/104 X |

OTHER PUBLICATIONS

1997 Nasco Farm & Ranch Catalog, Catalog No. 388, Fort Atkinson, Wisconsin, Sep. 1996, p. 28.

*Primary Examiner*—Henry Bennett
*Assistant Examiner*—Steve Gravini
*Attorney, Agent, or Firm*—Richard C. Litman

[57] ABSTRACT

An apparatus for grooming recently washed animals prior to exhibition at livestock shows, and made up of a portable plastic PVC canister housing in a T-Y configuration having three sections. Air intake openings housing electric blower motors are in the first two sections of the housing, and an exhaust outlet having a threaded nozzle for attaching a hose is in the third section. The housing has a handle to facilitate carrying and two legs attached to the housing to support the apparatus off the ground. A toggle switch controls the operation of the apparatus.

12 Claims, 1 Drawing Sheet

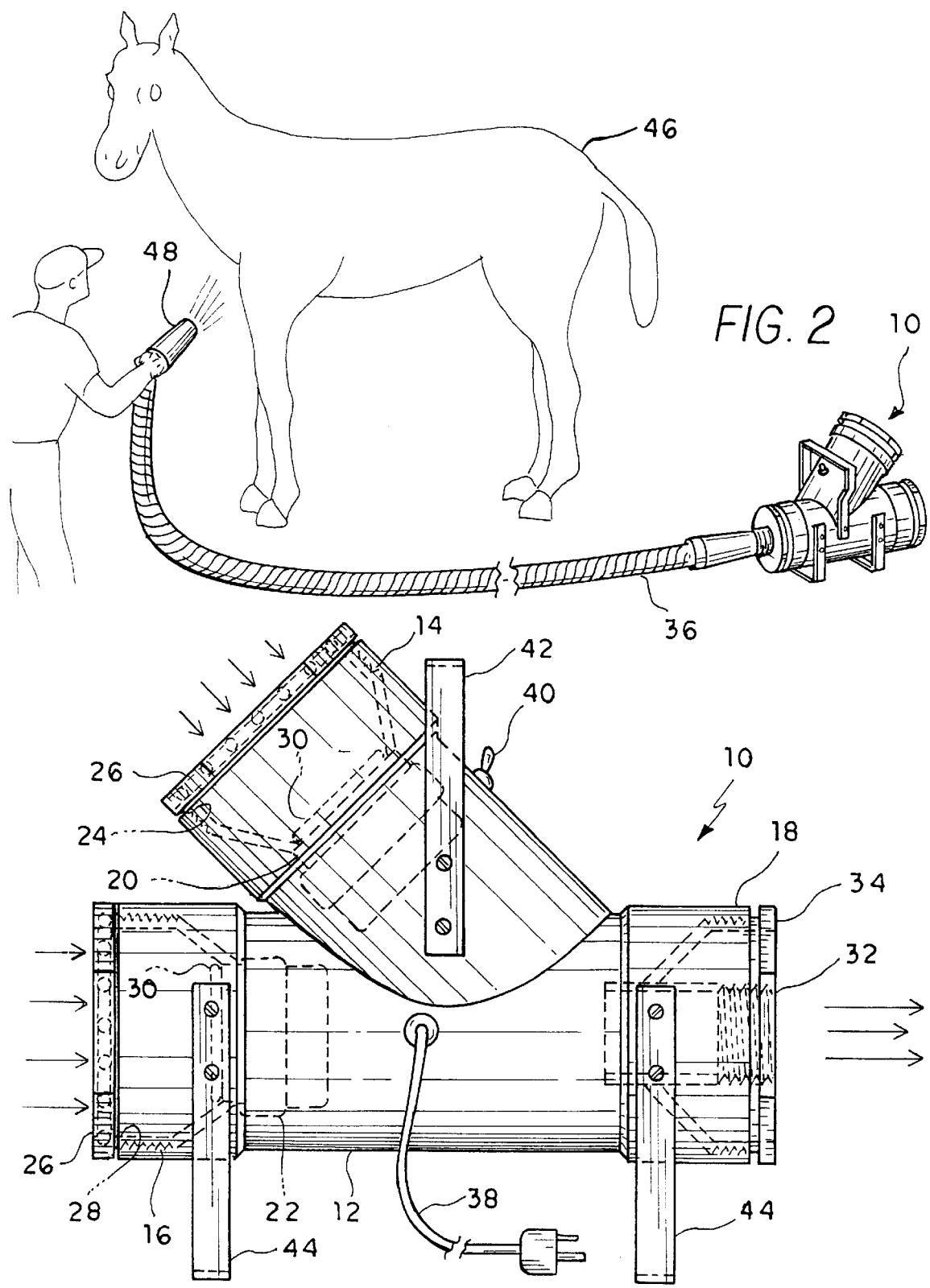

ANIMAL GROOMING APPARATUS

CROSS-REFERENCE TO RELATED APPLICATION

This application claims the benefit of U.S. Provisional Patent Application Ser. No. 60/032,983, filed Dec. 16, 1996.

FIELD OF THE INVENTION

The present invention relates to a device for grooming animals, and more particularly to an air blower for grooming recently-washed animals prior to exhibition at livestock shows.

DESCRIPTION OF PRIOR ART

In the competitive field of livestock breeding and showing, owners strive to have the best-looking animals that command the most money. In an attempt to achieve this goal, owners typically wash their animals frequently, especially prior to livestock shows. After washing, the wet animal is towel-dried by hand and then covered with a blanket—an arduous, fatiguing and time-consuming process, which makes owners hesitant to wash the animal at all. During the tedious process of drying a large animal by hand, parts of the animal's coat may not be reached for some time, resulting in discomfort or even illness of the animal, which in turn may net the owner less money at a livestock show. Such results may also occur when, in an effort to save time, the care that is necessary to completely dry the animal is not taken.

Air blowing devices designed to dry the coat of a large animal have been known and commercially available for a number of years. Traditional hand held hair dryers have been used in the past, but do not provide enough airflow to the animal's coat to dry it in a reasonable amount of time. Further, the loud noise generated by such dryers in such close proximity to the ears of the animal often spooks the animal, which may result in violent reactions such as kicking or rearing-up.

Air blowers with a separate blower motor housing and hose have also been known for some time. In order to satisfactorily dry the coat of a large animal, blowers require strong motors to pass enough air through long lengths of hose. Nacso dryer models C12870N, C12869N and C14797N, and the Electric Cleaner Company's Mini Circ®, shown on page 28 of the 1997 issue of Nasco Farm & Ranch Catalog, are electric, livestock grooming devices, each having a separate blower motor housing and hose. However, these devices employ a single blower motor, which lacks the power to provide significant airflow through a long hose to adequately dry the coat of a large animal. Additionally, these devices are contained within metal housings which generate excessive noise, requiring that the device be located even further away from the animal, which in turn requires use of an even longer hose.

In part to overcome such disadvantages, blowing devices having plastic housings have been introduced to the marketplace; exemplary models include The Large Animal Challengair® and the Challengair® 2000, shown on page 28 of the 1997 issue of Nasco Farm & Ranch Catalog. However, these single motor blowers still do not deliver enough airflow to adequately and quickly dry the coat of a large animal.

Other blowing devices have attempted to compensate for weak airflow by providing a heating element within the blower motor housing. The Nasco Animal Dryer with Heat C14797N, which can be found on page 28 of the 1997 Nasco Farm & Ranch Catalog, U.S. Pat. No. 4,934,069 which issued to Bruno Kagi on Jun. 19, 1990, and U.S. Pat. No. 5,251,281 which issued to Clifford H. Fravel, Jr. on Oct. 5, 1993, teach blowing devices with integrated heating elements. Unfortunately, an electric blower motor (which inherently generates a significant amount of heat), when used in combination with an electric heating element, is likely to overheat and chap the sensitive skin of an animal and possibly cause the animal to react violently.

Other blower manufacturers have sold animal grooming devices with two or more separate blower motors, thereby enabling the user to vary airflow. Two such devices are the Circuiteer® I and Circuiteer® II, which may be found shown on page 28 of the 1997 issue of Nasco Farm & Ranch Catalog. These devices contain dual motors installed in series within a single metal canister housing. This serial arrangement, however, is inefficient in that both motors share the same intake and exhaust openings. Hence, when only one motor is operating, the other motor is forced to turn as well, which increases wear and tear on the motors, thereby reducing the life of the device. It is therefore much more desirable to place each blower motor in its own chamber, thereby increasing efficiency of the device.

None of the above inventions and patents, taken either singularly or in combination, is seen to describe the instant invention as claimed. Thus, an animal grooming apparatus solving the aforementioned problems is desired.

SUMMARY OF THE INVENTION

The present invention provides an apparatus for grooming recently-washed animals prior to exhibition at livestock shows. The apparatus is a portable plastic PVC canister housing in a T-Y configuration having three sections. A pair of intake openings, each housing a respective electric blower motor, are in the first two respective sections of the housing, and an exhaust outlet having an internally threaded nozzle for attaching a hose is in the third section. Having two blower motors operating in parallel enables the apparatus to operate more efficiently, reduces wear-and-tear on the apparatus, and eliminates the need for a heating element.

A filter may be removably attached antecedently to where air enters the blower motors. Additionally, each air intake opening is defined and protected by a grille to prevent unwanted debris from entering the device. The housing has a handle to facilitate carrying and two legs attached to the housing to keep the apparatus off the ground and to minimize vibration. An adjustable toggle controls the independent operation of the motors of the apparatus.

Accordingly, it is a principal object of the invention to provide an apparatus for grooming recently washed animals prior to exhibition at livestock shows.

It is another object of the invention to provide an animal grooming apparatus with two independently housed blower motors that allow adequate airflow through an elongated hose while minimizing strain on the blower motors.

It is a further object of the invention to provide an animal grooming apparatus with a plastic housing, to save weight, minimize motor noise and vibration, and eliminate the possibility of rust.

It is an object of the invention to provide improved elements and arrangements thereof in an animal grooming apparatus for the purposes described which is inexpensive, safe, dependable and fully effective in accomplishing its intended purposes.

These and other objects of the present invention will become readily apparent upon further review of the following specification and drawings.

BRIEF DESCRIPTION OF THE DRAWINGS

FIG. 1 is a side elevational view of an animal grooming apparatus according to the present invention, showing certain internal details in phantom lines.

FIG. 2 is an environmental, perspective view of an animal grooming apparatus according to the present invention.

Similar reference characters denote corresponding features consistently throughout the attached drawings.

DETAILED DESCRIPTION OF THE PREFERRED EMBODIMENTS

Referring now to the drawings wherein like numerals represent like parts, FIG. 1 shows a side elevational view of an animal grooming apparatus 10 in accordance with the preferred embodiment of the present invention, showing certain internal details in phantom lines. In the preferred embodiment, the apparatus 10 includes an enclosed housing 12 of a T-Y configuration, being a branched cylinder that is preferably six inches in diameter. Preferably, the enclosed housing 12 is manufactured of a light and stiff moldable material, as, for example, PVC plastic. The T-Y-configured housing 12 has an upper air intake chamber 14, a lower air intake chamber 16, and an exhaust chamber 18. An upper electric blower motor 20 is housed proximate to the upper air intake chamber 14. A lower electric blower motor 22 is housed proximate to the lower air intake chamber 16.

In the preferred embodiment, an electric blower motor is used as known in the prior art, having features such as variable blower speeds, although other means for blowing air may be used in alternative embodiments. Air enters the upper air intake chamber 14 through the upper air intake opening 24, which is defined by a grille 26 that prevents foreign matter from entering the upper air intake chamber. Air enters the lower air intake chamber 16 through the lower air intake opening 28, which is similarly defined by a grille 26 that prevents foreign matter from entering the lower air intake chamber.

Once air passes through the air intake chambers 14, 16, the air is forced into the exhaust chamber 18 by the blower motors 20, 22. If desired, however, the air blower motors 20, 22 may be protected from dust and debris by the insertion of a filter 30 at point antecedent to where air enters the blower motors 20, 22. Air then passes from the exhaust chamber 18, through a threaded exhaust opening 32. The exhaust opening 32 is defined by a reducer 34 that reduces the diameter of the exhaust opening from six inches to two inches. Once the air is passed through the exhaust opening 34, the air is blown out through a hose 36 threadably attached to the reducer 34, as shown in FIG. 2. The exhaust opening 32 is internally threaded to reduce the overall length of the apparatus 10, thereby increasing portability of the apparatus.

In the preferred embodiment, power is supplied to electric blower motors 20, 22 by an electric cord 38 which is plugged into an AC electrical outlet (not shown), although other sources of power may be used. The apparatus 10 is activated and controlled by a multi-position (off, motor 1 on, motor 2 on, motors 1 and 2 on, off) toggle switch 40 that allows each of the blower motors 20, 22 to be controlled independently; a separate or combined rheostat switch allows the speed of each motor 20, 22 to be varied.

Use of both blower motors 20, 22 together in parallel allows for maximum airflow through the apparatus 10, enabling the user to attach a hose of greater length and diameter than could be used with a standard single-motor air blower. Use of both blower motors 20, 22 together in parallel additionally eliminates the need of a power-consuming and chapping heating element.

When grooming a smaller, younger animal, a lesser amount of airflow is likely to be desired. The apparatus 10 may then be used with one blower motor operating, by positioning the toggle switch 40 so that only the upper blower motor 20 or only the lower blower motor 22 functions.

The apparatus 10 includes a handle 42 to facilitate carrying and to enhance portability. The apparatus 10 also has two legs 44 designed to keep the apparatus approximately two inches off the ground, to keep the apparatus free of vibration and to keep the electrical motors away from water that may be on the ground.

Referring now to FIG. 2, an environmental view of the apparatus 10 is show as the apparatus might be used to dry the coat of a large animal 46. The apparatus 10 is placed at a safe distance from the animal 46 and a nozzle 48 is aimed over the coat of the animal until the coat is groomed as desired.

It is to be understood that the present invention is not limited to the embodiments described above, but encompasses any and all embodiments within the scope of the following claims.

I claim:

1. An animal grooming apparatus comprising:
   a portable canister housing having a first air intake opening, a second air intake opening and an exhaust outlet;
   a first electrical blower motor for blowing air disposed within said canister housing proximate to said first air intake opening; and,
   a second electrical blower motor for blowing air disposed within said canister housing proximate to said second air intake opening.

2. The animal grooming apparatus as defined in claim 1, wherein said canister housing has a T-Y configuration defining a first section, a second section, and a third section, said first air intake opening terminating said first section, said second air intake terminating said second section, and said exhaust outlet terminating said third section.

3. The animal grooming apparatus as defined in claim 2, wherein said sections of said canister housing are each six inches in diameter.

4. The animal grooming apparatus as defined in claim 1, further comprising a removable hose attachable to said exhaust outlet, and wherein said exhaust outlet is provided with means of attaching said removable hose to said exhaust outlet.

5. The animal grooming apparatus as defined in claim 4, wherein said exhaust outlet has an internally threaded means for removably and threadably attaching said hose.

6. The animal grooming apparatus as defined in claim 1, wherein said canister housing is constructed of material selected from the group consisting of plastic and fiberglass.

7. The animal grooming apparatus as defined in claim 1, further comprising a handle attached to said canister housing to facilitate carrying.

8. The animal grooming apparatus as defined in claim 1, further comprising at least two support legs attached to said canister housing.

9. The animal grooming apparatus as defined in claim 1, further comprising toggle switch means for controlling the operation of said apparatus.

10. An animal grooming apparatus comprising:
    a portable plastic PVC canister housing in a T-Y configuration, and having a first section, a second section and a third section, each of said sections being on the order of six inches in diameter, said housing further having:
  a first air intake opening in said first section of said housing, said opening having an first electric blower motor disposed within said housing proximate to said first air intake opening;
  a second air intake opening in said second section of said housing, said opening having an second electric blower motor disposed within said housing proximate to said second air intake opening; and
  an exhaust outlet in said third section, said outlet having a threaded means for attaching a hose;
a removable hose threadably attachable to said exhaust outlet of said housing;
a carrying handle attached to said housing;
at least two support legs attached to said housing; and
toggle switch means for controlling the operation of said apparatus.

11. The animal grooming apparatus as defined in claim 10, said toggle switch means including rheostat means for varying the operation of at least one of said first and second motors.

12. The animal grooming apparatus as defined in claim 10, said toggle switch means including rheostat means for varying the operation of both of said first and second motors.

* * * * *